Patented Feb. 11, 1941

2,231,758

UNITED STATES PATENT OFFICE 2,231,758

PROCESS FOR RESOLVING PETROLEUM EMULSIONS

Melvin De Groote, University City, and Bernhard Keiser and Charles M. Blair, Jr., Webster Groves, Mo., assignors to Petrolite Corporation, Ltd., Wilmington, Del., a corporation of Delaware No Drawing. Application January 26, 1940, Serial No. 315,765

10 Claims. (Cl. 252—341)

This application is a continuation, in part, of our pending application for patent Serial No. 268,816, filed April 19, 1939, now Patent 2,192,993 dated Mar. 12, 1940, for Process for resolving petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

Attention is directed to our U. S. Patent No. 2,154,422, dated April 18, 1939. In said patent there is described, among other things, a new composition of matter, which is particularly adapted for use as a demulsifier in the resolution of crude oil emulsions, and which consists of a certain kind of complex amine derived by reaction between: (a) a polybasic carboxy acid body, particularly a dibasic carboxy acid body, such as phthalic anhydride; and (b) simpler amines of the kind therein described. It is pointed out in said patent that wherever a carboxyl radical, particularly the carboxyl radical of the polybasic carboxy acid, exists, it may be permitted to remain as such, or the hydrogen atom thereof may be replaced by some suitable metallic atom, or by some organic radical, or by any other suitable means indicated in said patent. One sub-class or species of the broad genus described in said patent is the type in which the carboxylic hydrogen atom has been replaced by an organic radical obtained by dehydroxylation of a hydroxylated basic amine, such as ethanolamine, diethanolamine, triethanolamine, etc.

If, instead of using triethanolamine or the like, one employs instead, a polymerized hydroxy amine, then one obtains a chemical compound which is considerably more effective as a demulsifier than the comparable compound derived from unpolymerized triethanolamine or the like. It is well known that alkylol amines or similar basic hydroxy amines, i. e., amines characterized by the fact that there is no aryl radical directly attached to the amino nitrogen atom, can be polymerized by heating to elevated temperatures, particularly in the presence of suitable catalysts. Generally speaking, the catalysts are basic materials, or materials having a basic reaction, such as caustic soda, soap and the like. Polymerized amines contain two or more amino nitrogen atoms, but the most desirable form for our purpose is the form in which there are at least three nitrogen atoms present, and not more than five nitrogen atoms. Such amines may be polymerized to the degree that the material shows surface activity, when dissolved in water, either in the form of the amine (forming a base with water, of course), or in the form of a salt, such as the acetate. For the sake of convenience, we will refer to the polymerized amines, broadly, as the polymerized product. We will refer to the form containing two nitrogen atoms as the dimeric form, and the type containing three, four or five nitrogen atoms, as the polymeric form. When sufficiently polymerized, the product will be surface active. This means that a dilute solution, as such, or in the form of the acetate (for instance, one tenth of 1% to 1%) will foam. We will refer to such type as the highly polymerized surface active form. In actual practice, the amine that is available most cheaply and which polymerizes most readily and which gives the most desirable type of demulsifier, is triethanolamine, particularly commercial triethanolamine, which, as is known, contains a small amount of monoethanolamine and an appreciable amont of diethanolamine. The composition of such polymerized amines is not definitely known, except that the polymerization takes place obviously by virtue of ether linkages. Examination of triethanolamine, for example, indicates that cyclic polymers could be formed, or linear polymers could be formed, or polymers could be formed which involve both linear and cyclic formations.

Needless to say, since polymerization involves ether linkages, one may include a polyhydric alcohol, such as a glycol or glycerol, ricinoleyl alcohol, or one might include polyhydric alcohols containing ether linkages, such as diethylene glycol, diglycerol, triglycerol, tetraglycerol, and the like. Monohydric alcohols, of course, can be employed only to form ether linkages with a terminal hydroxyl group. Thus, one mole of triethanolamine, for example, and three moles of ethyl alcohol might not form a highly polymerized material. The principle involved, of course, is readily understood, in view of the common theory of polyfuctionality in regard to resinous or subresinous materials derived from polyhydric alcohols and polybasic acids. To produce highly polymerized materials one must have reactants which are at least bifunctional. In polymerizations of the kind described the polyhydroxylated amines are bifunctional or polyfunctional intermolecularly. Monohydroxylated amines, such as ethanolamine, or a diethylethanolamine, are in the same class as monohydric alcohols, i. e., they are mono-functional, unless, as far as the material such as monoethanolamine is concerned, the hydrogen atoms attached to amino nitrogen atom could be removed with the formation of water, with the result that instead of an ether linkage, there is a direct carbon atom, nitrogen atom bond. Thus, in the claims reference will be made to the polymerization of polyfunctional alkylol amines, the intention being to emphasize this particular feature. As has been indicated, however, mono-functional compounds, such as monohydric alcohols, and certain monohydroxy amines are acceptable to form part of the polymerized compound or composition. Furthermore, polyhydric alcohols may be employed to produce the same polymeric structures as polyhydrated amines. The preferred type of compound, however, is prepared without the introduction of polyhydric alcohols, such as glycerols, glycols, and the like. If desired, such particular type of preferred polymer may be indicated as being free from polyhydric alcohol residues, or more broadly, free from alcohol residues, the word "alcohol" being used in the sense to refer to non-amino bodies, i. e., the glycols and glycerols, and is not intended to refer to aminoalcohols as the term is sometimes used in the description of triethanolamine or the like.

The polymerization of the basic hydroxy amines is effected by heating same at elevated tempertures, generally in the neighborhood of 200 to 270° C., preferably in the presence of catalysts, such as sodium hyroxide, postassium hydroxide, sodium ethylate, sodium glycerate, or catalysts of the kind commonly employed in the manufacture of superglycerinated fats and the like. The proportion of catalysts employed may vary from slightly less than one tenth of 1% in some instances, to slightly over 1% in other instances.

Needless to say, in the event the alcohol amine is low boiling, customary precautions must be taken so as not to lose part of the reactants. On the other hand, conditions must be such as to permit the removal of water formed during the process. At times the process can be conducted most readily by permitting part of the volatile constituents to distill, and subsequently subjecting the vapors to condensation. The condensed volatile distillate usually contains the water formed by etherization. Water can be separated from such condensed distillate by any suitable means, for instance, distilling with xylene, or removal of the water and subsequent removal of the xylene. The dried condensate is then returned to the reaction chamber for further use. In some instances, condensation can best be conducted in the presence of a high boiling solvent, which is permitted to distill in such a manner as to remove water of reaction. In any event, the speed of reaction and the character of the polymerized product depends not only upon the original reactants themselves, but also on the nature and amount of catalyst employed, on the temperature employed, time of reaction and speed of water removal, i. e., the effectiveness with which the water of reaction is removed from the combining mass. Polymerization can be effected without the use of catalysts in the majority of instances, but such procedure is generally undesirable, due to the fact that reaction takes a prolonged period of time and usually a significantly higher temperature. It is noted that in the subsequent examples the final compositions of matter which are contemplated, particularly for use as demulsifiers, are preferably derived by means of water-soluble polymerized hydroxy amines as one of the reactants. Thus, all the subsequent description of polymerized hydroxy amines has been limited largely to the type which is water-soluble, and is obviously the preferred type. However, it must be recognized that polymerized hydroxy amines, particularly if polymerized for a fairly long period of time, at a fairly high temperature, and in the presence of an active catalyst, may result in a polymerization reaction which ends in a product that is water-insoluble, or substantially water-insoluble. Obviously, such water-insoluble material can be obtained more readily from a higher hydroxy amine than from a lower one. In other words, tributanolamine, trihexanolamine, trioctanolamine, etc., would yield such insoluble products much more readily than triethanolamine.

Incidentally, it also must be recognized that the speed of reaction and the degree of polymerization is affected by the nature of the vessel in which the reaction takes place. In the examples cited, it is intended that reaction take place in a metal vessel, such as iron. However, in order to obtain the same degree of polymerization when conducting the reaction in a glass lined vessel, it is quite likely that the period of reaction would have to be increased 150 to 400%.

Suitable hydroxy primary and secondary amines which may be employed to produce materials of the kind above described includes the following: diethanolamine, monoethanolamine, ethyl ethanolamine, methyl ethanolamine, propanolamine, dipropanolamine, propyl propanolamine, etc. Other examples include cyclohexanolamine, dicyclohexanolamine, cyclohexyl ethanolamine, cyclohexyl propanolamine, benzyl ethanolamine, benzyl propanolamine, pentanolamine, hexanolamine, octyl ethanolamine, octadecyl ethanolamine, cyclohexanol ethanolamine, etc.

Similarly, suitable hydroxy tertiary amines which may be employed include the following: triethanolamine, diethanolalkylamines, such as diethanol ethylamine, diethanol propylamine, etc. Other examples include diethanol propylamine, etc. Other examples include diethanol methylamine, tripropanolamine, dipropanol methylamine, cyclohexanol diethanolamine, dicyclohexanol ethanolamine, cyclohexyl diethanolamine, dicyclohexyl ethanolamine, dicyclohexanol ethylamine, benzyl diethanolamine, dibenzylethanolamine, benzyl dipropanolamine, tripentanolamine, trihexanolamine, ethyl hexyl ethanolamine, octadecyl diethanolamine, polyethanolamine, etc.

It is also known that one may have amines of the type:

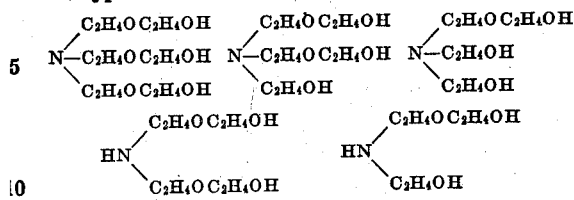

Such amines may serve as functional equivalents of the previously described amines.

Attention is directed to the fact that the alkylolamines are obtained in such a manner that they may be looked upon as being derivatives of dihydric alcohols or of the chlorhydrins of the dihydric alcohols. For example, the alkylolamines may be prepared as follows:

As previously stated, the $C_2H_4$ radical may be any one of a number of hydrocarbon radicals which are aliphatic, alicyclic, or aralkyl in nature.

It is at once manifest that similar derivatives are available from glycerols, polyglycerols, and the like, as indicated by the following reaction:

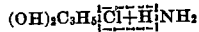

It is not necessary to point out that the same types of reactions will produce secondary or tertiary amines, and that the reaction is not limited to a combination with ammonia, but may take place with a combination of other primary or secondary amines, such as amylamine, diamylamine, cyclohexylamine, dicyclohexylamine, benzylamine, dibenzylamine, amyl cyclohexylamine, etc.

This means that in the types of material previously described, there is a wide variety of material, such as monoglycerylamine, diglycerylamine, monoglyceryl diethylamine, monoglyceryl dipropylamine, diglyceryl propylamine, triglycerylamine, etc., which are functional equivalents of the various amines previously described. All that has been said here in regard to functional equivalents will be perfectly obvious without further explanation to those skilled in the art. See U. S. Patent No. 2,091,704, dated August 31, 1937, to Duncan and McAllister, and also U. S. Patent No. 2,042,621, dated June 2, 1936, to Olin.

Attention is directed to co-pending application for Patent Serial No. 273,221, filed May 12, 1939, by Melvin De Groote. Said aforementioned application describes, among other things, the formation of hydroxy diamines, particularly certain hydroxylated methylene diamines by reactions involving an aldehyde, such as formaldehyde, and secondary amines, as, for example, diethanolamine. In such reaction the amino hydrogen atoms are removed along with the oxygen of the aldehyde, for instance, the oxygen atom of formaldehyde. The resultant product is tetraethanolmethylene diamine. Such hydroxylated amines, or comparable types, such as polyethylene diamines, may be employed. In the same manner as the other hydroxylated amines of the kind previously described.

Attention is also directed to co-pending application for patent Serial No. 273,278, filed May 12, 1939, by Melvin De Groote and Bernhard Keiser. Briefly stated, said co-pending application teaches, among other things, the formation of certain hydroxylated amines by means of an alcoholate derived, for example, from triethanolamine and a chlorhydrin, such as glycerine chlorhydrin, and the like. Examples of hydroxylated amines obtained by the procedure described in said aforementioned De Groote and Keiser application may be illustrated by the following examples:

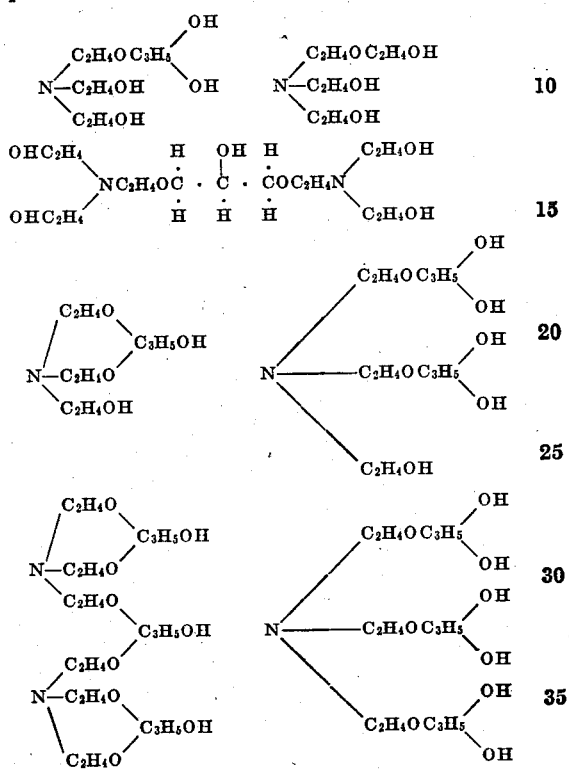

Attention is also directed to the fact that suitable amines include tris(hydroxymethyl) aminomethane, and derivatives thereof, obtained in various manners, for instance, by reaction with chlorhydrins, alkyl chlorides, and the like, particularly ethylene glycol chlorhydrin, glyceryl monochlorhydrin, etc.

*Polymerized hydroxy amine—Example 1*

One percent of caustic soda is added to commercial triethanolamine and the product heated for approximately three hours at 245–260° C. The mass is stirred constantly, and any distillate is condensed and reserved for re-use after an intermediate running step. At the end of approximately two and one-half to three and one-half hours, the molecular weight determination shows that the material is largely dimeric.

*Polymerized hydroxy amine—Example 2*

The same procedure is employed as in the previous example, except that heating is continued for approximately another hour. In this instance the reaction mass is largely a polymeric material with an average molecular weight range indicating the presence of approximately three to four nitrogen atoms in the polymerized mass.

*Polymerized hydroxy amine—Example 3*

The same procedure is followed as in Example 2, except that a slightly higher temperature, approximately 10° higher, is employed, and a somewhat longer time of reaction, for instance, one-half to one and one-half hours longer. In any event, the reaction is continued until the product obtained either as such, or in the form of the acetate, dissolves in water (for instance, a solution varying in concentration from one tenth of 1% to 1%) and gives a foamy solution indicating high surface activity.

*Polymerized hydroxy amine—Example 4*

Tri-isopropanolamine is substituted for triethanolamine in Examples 1, 2 and 3.

*Polymerized hydroxy amine—Example 5*

Tripentanolamine is substituted for triethanolamine in Examples 1, 2 and 3.

*Polymerized hydroxy amine—Example 6*

Polyethanolamine of the following formula:

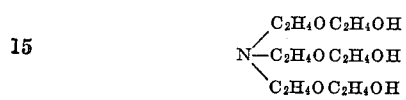

is substituted for triethanolamine in the previous examples.

*Polymerized hydroxy amine—Example 7*

Mixtures of the various amines previously described are made with glycerol in the proportion of two parts of hydroxy amine and one part of glycerol. One percent of caustic soda is added to the mixture and the same procedure employed as indicated in Examples 1, 2 and 3, although there may be some variation necessary to obtain the proper molecular weight range and surface activity. In any event, molecular weight determinations can be employed, as well as a foam test of the kind previously described.

*Polymerized hydroxy amine—Example 8*

Diglycerylamine is substituted for triethanolamine, in Examples 1, 2 and 3, previously described.

As previously stated, the preferred polymerized hydroxy amines are water-soluble, but the water-insoluble type, or substantially water-insoluble type, of the kind previously referred to, may also be employed. Furthermore, it must be remembered that the final criterion of degree of polymerization, especially in the initial stages, is dependent upon an actual molecular weight determination, rather than based on time of reaction.

In order to briefly characterize the type of material contemplated, it may be reduced to its simplest terms in the following manner: The reaction product of a polybasic acid body and an acylated amine of the kind to be described is characterized by having one or more free carboxyl radicals, and thus could be indicated in the following manner:

$$D.(COOH)_b$$

in which $b$ is a small whole number, and D, of course, is a residue of the kind to be described. Similarly, if the acidic hydrogen atom is replaced by a suitable equivalent, then the formula may be rewritten:

$$D.(COOZ)_b$$

in which Z represents any suitable atom, such as a sodium atom, or a radical, such as an ethyl radical, or may even represent the acidic hydrogen atom itself. Then, in the present instance, the specific sub-class may be conveniently indicated, at least temporarily, by:

$$[D]\begin{bmatrix}(COOZ)_{b'} \\ (COOT)_b\end{bmatrix}$$

in which all of the characters have their previous significance; $b'$ may be zero or a small whole number; and T is a residue derived by dehydroxylation of a polymerized hydroxy amine characterized by the presence of at least one free hydroxyl radical. The polymerized hydroxy amines, previously described, would always have at least one free hydroxyl radical, except in those instances where all of the hydroxyl radicals were eliminated by an etherization reaction with a monohydric alcohol or an acylation reaction.

It is obvious that the particular sub-class herein contemplated may be obtained in various manners, such as by reacting phthalic acid or the anhydride with the complex amine, and then reacting such acidic fractional ester with the polymerized hydroxy amine. On the other hand, the polymerized amine might be reacted with phthalic anhydride or the like and then with the acylated amine. Other methods suggest themselves. (See aforementioned U. S. Patent No. 2,154,422 in regard to further details concerning the subject-matter which follows immediately.)

One can obtain or manufacture chemical compounds whose composition is indicated by the following formulas:

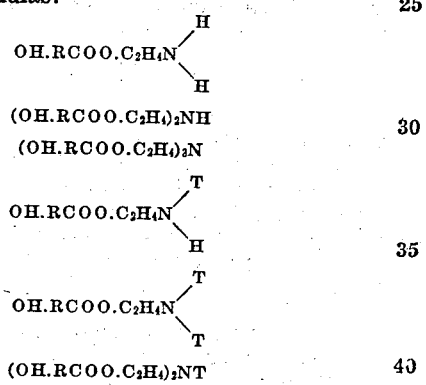

The compounds above described may be summarized by the following formula:

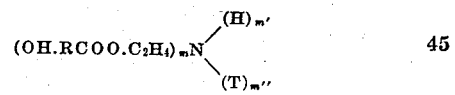

in which $m$ represents the numeral 1, 2 or 3, $m'$ represents the numeral 0, 1 or 2, and $m''$ represents the numeral 0, 1 or 2, with the proviso that $m+m'+m''=3$.

However, the radical $C_2H_4$, which appears in the above formula, may represent any similar radical, such as a $C_3H_6$ radical, $C_4H_8$ radical, etc., and therefore, the above formula may be rewritten:

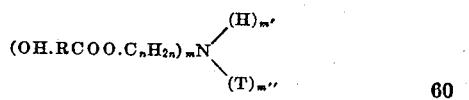

where $n$ represents a small whole number, preferably not over 10.

In the above formulas, T represents a non-hydroxy aliphatic hydrocarbon radical, such as a methyl, ethyl, propyl, amyl, or similar radical; or T may represent a non-hydroxy alicyclic radical, such as a cyclohexyl radical, or a non-hydroxy aralkyl radical, such as a benzyl radical; or the acylated radical obtained by replacing a hydrogen atom of the hydroxyl group of an alkylol radical by the acyl radical of a monobasic carboxy acid, such as acetic acid, butyric acid, oleic acid, stearic acid, naphthenic acid, abietic acid, or the like, all of which are characterized by having less than 32 carbon atoms. The alkylol radical, prior to acylation, may be a hydroxy alicyclic or a hydroxy aralkyl radical, provided that the hydroxy radical is attached to the aliphatic residue of the aralkyl radical. In the above formulas, OH.RCOOH represents a hydroxylated fatty acid, such as ricinoleic acid, hydroxystearic acid, dihydroxystearic acid, diricinoleic acid, triricinoleic acid, polyricinoleic acid, etc.; and OH.RCOO represents the oxy acyl radical derived from such acid, i. e., the ordinary acid radical.

As to the amines above described which happen to be tertiary amines, it may be well to point out that they may be formed readily by a reaction involving an ester of the hydroxylated fatty acid and a corresponding amine. This may be illustrated in the following manner:

(OH.RCOO)$_3$C$_3$H$_5$+(OH.C$_2$H$_4$)$_3$N →
(OH.R.COO.C$_2$H$_4$)$_3$N

Reference is made to co-pending application for patent, Serial No. 180,993, filed December 21, 1937, by Melvin De Groote, Bernhard Keiser and Charles M. Blair, Jr. If triethanolamine, as employed in the above formulas, is replaced by ethyl diethanolamine, or by diethyl ethanolamine, then one would readily obtain the other two types of tertiary amines illustrated. Reference is also made to U. S. Patent No. 2,167,349, dated July 25, 1939, to De Groote, Keiser and Blair.

In the remaining three types of materials there is at least one amine hydrogen atom present. The manufacture of such type material may be illustrated by the following reactions:

OH.R.COOH+OHC$_2$H$_4$OH ⟶ OH.R.COO.C$_2$H$_4$OH
OH.R.COO.C$_2$H$_4$OH+HCl ⟶ OH.R.COO.C$_2$H$_4$Cl
OH.R.CO.Cl+OHC$_2$H$_4$OH ⟶ OH.R.COO.C$_2$H$_4$OH
OH.R.COO.C$_2$H$_4$OH+HCl ⟶ OH.R.COO.C$_2$H$_4$Cl
OH.R.COOH+OHC$_2$H$_4$Cl ⟶ OH.R.COO.C$_2$H$_4$Cl
OH.R.COOR'+OHC$_2$H$_4$Cl ⟶ OH.R.COO.C$_2$H$_4$Cl
OH.R.CO.Cl+OHC$_2$H$_4$Cl ⟶ OH.R.COO.C$_2$H$_4$Cl
OH.R.COO.C$_2$H$_4$Cl+NH$_3$ ⟶ OH.R.COO.C$_2$H$_4$NH$_2$
2OH.R.COO.C$_2$H$_4$Cl+NH$_3$ ⟶ (OH.R.COO.C$_2$H$_4$)$_2$NH

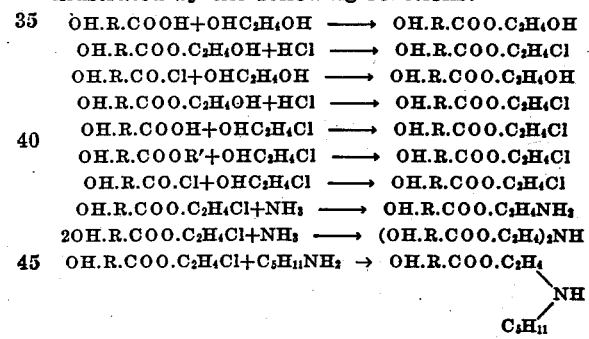

OH.R.COO.C$_2$H$_4$Cl+C$_5$H$_{11}$NH$_2$ →
OH.R.COO.C$_2$H$_4$
\NH
/
C$_5$H$_{11}$

Similar reactions to the one immediately preceding result in compounds, such as:

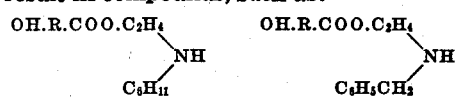

OH.R.COO.C$_2$H$_4$         OH.R.COO.C$_2$H$_4$
\NH                         \NH
/                           /
C$_5$H$_{11}$               C$_6$H$_5$CH$_2$

However, if maximum yields are not necessary, one need not resort to reactions of the kind previously described to produce amines having at least one amino hydrogen, but one may employ the following reactions:

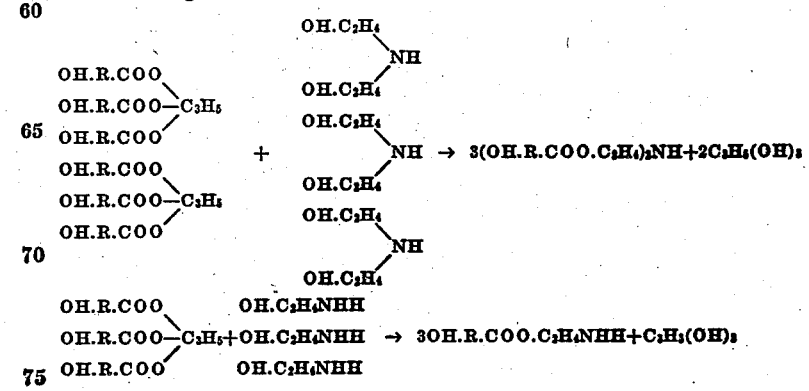

Naturally, if ethyl ethanolamine or a similar amine were to replace ethanolamine (monoethanolamine), one would obtain the remaining type of amine above illustrated.

Suitable hydroxy primary and secondary amines which may be employed to produce materials of the kind above described include the following: diethanolamine, monoethanolamine, ethyl ethanolamine, methyl ethanolamine, propanolamine, dipropanolamine, propyl propanolamine, etc. Other examples include cyclohexanolamine, dicyclohexanolamine, cyclohexyl ethanolamine, cyclohexyl propanolamine, benzyl ethanolamine, benzyl propanolamine, pentanolamine, hexanolamine, octyl ethanolamine, octadecyl ethanolamine, cyclohexanol ethanolamine, etc.

Similarly, suitable hydroxy tertiary amines, which may be employed, include the following: triethanolamine, diethanolamines, such as diethanol ethylamine, diethanol propylamine, etc. Other examples include diethanolmethylamine, tripropanolamine, dipropanol methylamine, cyclohexanol diethanolamine, dicyclohexanol ethanolamine, cyclohexyl diethanolamine, dicyclohexyl ethanolamine, dicyclohexanol ethylamine, dicyclohexanol ethylamine, benzyl diethanolamine, dibenzylethanolamine, benzyl dipropanolamine, tripentanolamine, trihexanolamine, ethyl hexyl ethanolamine, octadecyl diethanolamine, polyethanolamine, etc.

As has been stated, one may have amines of the type:

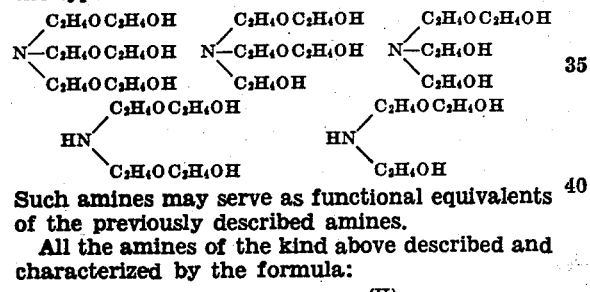

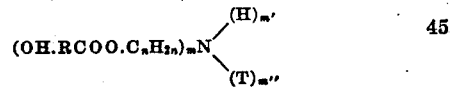

Such amines may serve as functional equivalents of the previously described amines.

All the amines of the kind above described and characterized by the formula:

$$(OH.RCOO.C_nH_{2n})_m N \begin{matrix} (H)_{m'} \\ (T)_{m''} \end{matrix}$$

in which $n$ represents a small whole number, preferably less than 10, and $m$ represents the numeral 1, 2 or 3, $m'$ represents the numeral 0, 1 or 2, and $m''$ represents the numeral 0, 1 or 2, with the proviso that $m+m'+m''=3$, and T has its previous significance.

Such amines are not quaternary ammonium compounds or salts thereof. Similarly, these amine compounds are not amides. Furthermore, they are derived only from basic amines. The word "basic" is employed to exclude amines having little or no basicity, such as the ordinary aromatic amines, or any amine having at least one aryl radical directly joined to the amino nitrogen atom. Finally, it must be recognized that these materials have not lost any basicity in the form of the esterified amine or basic polyamine; that is, they combine with water to form a base, presumably a substituted ammonium compound, or substituted poly-ammonium compound. They combine with various acids to form salts. It is to be noted, however, that these materials are not amine salts, i. e., amine salts of hydroxy fatty acids. If a hydroxy fatty acid be indicated thus:

OH.RCOOH and the amine thus:

then, as stated, the products of the kind described are not salts and do not conform to the salt formula:

Thus, the acylated amines of the kind described may be combined with acetic acid, hydrochloric acid, lactic acid, chloracetic acid, nitric acid, butyric acid, phosphoric acid, oxalic acid, or any suitable organic or inorganic acid to form salts. It is understood that reference in the specification and appended claims to amines includes the basic form, and the acid form, and the salt form, as well as the amine itself. Naturally, where more than one basic nitrogen atom exists in a compound, it is not necessary that all such nitrogen atoms be present in the same form, that is, the basic form, or the salt form. In fact, it is immaterial as to the particular state in which a basic nitrogen atom radical is present. This statement applies with equal force and effect to the final product or composition of matter which represents a basic amine or basic polyamine of a more complex type.

Reference is again made to the formula which summarizes the various amines used as intermediate raw materials, viz.:

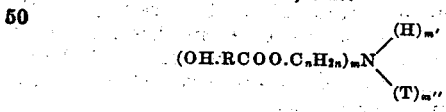

in which the characters have their previous significance.

Attention is directed to the fact that where the substituted alkyl radical OH.R.COO.C$_2$H$_4$—appears, a suitable non-aryl radical other than an aliphatic residue may serve as the functional equivalent; for instance, an alicyclic radical derived from a cyclohexyl radical, or an aralkyl radical derived from a benzyl radical. In other words, in the hereto appended claims reference to the C$_n$H$_{2n}$ radical as such, or as an alkyl radical or residue, is intended in the broad sense to include the alicyclic radicals or residues, or the aralkyl radicals or residues which are the equivalent thereof. There is no intention to include an aromatic radical where there is a direct linkage between the aromatic nucleus and the amino nitrogen atom, for the reason that such products have little or no basicity and do not have the characteristic properties of the amines previously described.

The manufacturer of intermediate compounds from tertiary amines is relatively simple, because no precautions are necessary to prevent amidification. The selected fatty oil and the selected hydroxy tertiary amine are mixed in suitable proportions and heated at some point above the boiling point of water, for instance, 110° C., and at a point below the decomposition point of the amine or the fatty oil; for instance, 180° C., for a suitable period of time, such as two to eight hours. Mild agitation is employed. A catalyst, such as sodium oleate, sodium carbonate, caustic soda, etc., may be present in amounts of about one-half of 1% or less. It is noted that the fatty acids are employed in this instance in the form of an ester, to wit, the glyceride, although, as previously pointed out, other functional equivalents can be readily employed with equal facility. It is to be noted that the reactions above described do not take place to any appreciable extent, if the fatty acid has been converted into the soap or salt. Such salts are not functional equivalents.

When, however, one is employing a hydroxy primary or a hydroxy secondary amine, precautions must be taken so that one gets a substantial percentage of products derived by esterification, rather than amidification. Any suitable ester may be employed, but it is often most convenient to use the glyceride, for instance triricinolein.

The selected glyceride and the selected hydroxy primary or secondary amine are mixed in suitable proportions and heated at some point above the boiling point of water; for instance, 110° C., and below the decomposition point of the amine or fatty material; for instance, 180° C., for a suitable period of time, such as four to twenty-four hours. Mid agitation is employed. A catalyst, such as sodium oleate, sodium carbonate, caustic soda, etc., may be present in amounts of about one-half percent, or less. It is to be noted that the fatty acids are present in ester form, and not in the form of the free acid, and thus there is no tendency to form the salt to any marked extent, and if conducted at the lower range of reaction temperatures, there is a decided tendency to form the esterification products, rather than the amidification products.

In order to illustrate suitable examples of the amines which may be used as intermediate raw materials, the following examples are given:

*Intermediate amine—Example 1*

Castor oil is employed. For the sake of convenience, its molecular weight is considered as being 925. Commercial triethanolamine and castor oil in the proportion of one mole of castor oil to one mole of triethanolamine are heated at a temperature between 150° and 180° C. for about two hours. Mild agitation is employed. The reaction product so produced may be used as such, or may be converted into the acetate or other suitable form. The product is characterized by freedom from non-esterified alkylol radicals.

*Intermediate amine—Example 2*

Polyethanolamine:

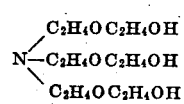

is substituted for triethanolamine in Example 1.

Intermediate amine—Example 3

Ethyl dihydroxy stearate is reacted in the previous manner with the various amines above enumerated in Examples 1 and 2. In this case three moles of ethyl dihydroxy stearate are reacted with one mole of the tertiary hydroxyamine.

Intermediate amine—Example 4

Methyl hydroxy stearate is employed to replace ethyl dihydroxy stearate in the examples indicated under Example 3 above.

Intermediate amine—Example 5

Castor oil (triricinolein) is employed. For convenience its molecular weight is considered as being 925. Commercial diethanolamine and castor oil in the proportion of two moles of castor oil to three moles of diethanolamine are heated at a temperature of 120–140° C. for about 12 hours. Mild agitation is employed. Loss of basicity is an indication of amidification. Time of reaction may be extended or temperature lowered or raised so as to insure maximum esterification. The reaction product, so produced, may be used as such, or may be converted into the acetate or other suitable form. The product should be free from non-esterified alkylol radicals.

Intermediate amine—Example 6

Ethanolamine is substituted for diethanolamine in Example 1, using three moles of ethanolamine for one mole of castor oil.

Intermediate amine—Example 7

Ethyl ethanolamine is substituted for diethanolamine in Example 1, using three moles of ethyl ethanolamine for one mole of castor oil.

Intermediate amine—Example 8

An ether amine of the following composition:

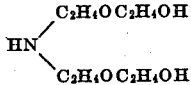

is substituted for diethanolamine in Example 5.

Having prepared the relatively simpler intermediate amine of the kind previously described, the second step in the preparation of the new composition of matter, is to produce an esterified amine of the kind obtainable by reaction of the intermediate amine above described and a polybasic carboxy acid or its functional equivalent, such as the anhydride, with the proviso that such functional equivalent shall not include (a) the acid esters derived by reaction between a polybasic acid, such as phthalic acid or its anhydride, and an alcohol acid (hydroxy acid), such as ricinoleic acid and the like; or (b) the acid ester derived by a reaction between a polybasic carboxy acid, such as phthalic acid and its anhydride, and a fractional ester of the detergent-forming acid, such as mono-olein, mono-naphthenin, mono-abietin, etc.

Detergent-forming acids are monobasic carboxy acids, such as typical fatty acids, abietic acids, or naphthenic acids. Typical fatty acids are those which occur in naturally-occurring oils and fats, and generally have eight or more carbon atoms and not over thirty-two carbon atoms. Common examples includes oleic acid, stearic acid, linoleic acid, linolenic acid, ricinoleic acid, erucic acid, palmitic acid, etc. These various monohydroxy acids combine with alkali such as caustic soda, caustic potash, etc., to produce soap or soap-like materials, and are commonly referred to as monobasic carboxy detergent-forming acids.

These last mentioned classes of materials which are not contemplated in the present invention are described in the two U. S. Patents Nos. 2,166,431 and 2,166,433, to Melvin De Groote, dated July 18, 1939.

The polybasic carboxy acids which may be employed, including some having at least three carboxyl radicals, are phthalic, succinic, malic, fumaric, citric, maleic, adipic, tartaric, glutaric, diphenic, naphthalic, oxalic, etc.

In view of what has been said previously, such polybasic carboxy acid ester must be of the kind in which there is available at least one carboxyl radical attached to the polybasic carboxy acid residue, and at least one such carboxyl radical or radicals must be esterified with a polymerized hydroxy amine of the kind which have been previously described in considerable detail. Needless to say, the final esterification step, for instance, the step involving the use of polymerized triethanolamine and phthalic anhydride bodies may take place prior to the esterification of the intermediate amine of the kind above described. For instance, one mole of polymerized triethanolamine containing on the average of about three to four amino nitrogen atoms per polymeric unit, may be treated with one mole of phthalic anhydride in such a manner as to yield a product having free carboxyl radicals. However, such procedure is apt to be more difficult, as a rule, than treating the acylated hydroxy amine with phthalic anhydride, and then treating the phthalated body with a polymerized amine. The reason is, that reaction between the phthalic anhydride and polymerized amine directly may give insoluble or almost insoluble masses, which re-act very slowly with the acylated amine. It is to be noted, of course, that if the polymerized hydroxy amine contained an acylated radical, that it still would permit the product to act in the same functional manner as if the acyl radical were absent. Such acyl radical might be derived from a detergent-forming acid, or from an acid having less than eight carbon atoms, as, for example, acetic acid, butyric acid, or heptoic acid. For the sake of convenience, the products will be described which employ the preferred procedure, i. e., reacting the acylated amine with phthalic anhydride, and then reacting the carboxy body so obtained with the polymerized hydroxy amine previously described.

Semi-finished esterification product, Example 1

Castor oil is reacted with triethanolamine (see Example 1 in previous group of intermediate amine examples), so as to produce material corresponding to (OH.R.COO.C$_2$H$_4$)$_3$N, in which OH.R.COO represents the ricinoleic acid radical. One molecular weight of this material is reacted with three molecular weights of phthalic anhydride. This is a conventional esterification reaction, and the materials are intimately mixed and heated to approximately 120–160° C., with constant agitation, until samples taken from the batch and analyzed show substantially complete disappearance of the hydroxyl value and substantially no free phthalic anhydride. In event that the hydroxyl value disappears and phthalic anhydride is still present, the amount should be decreased to approximately 2¼ or 2½ moles, or thereabouts. A suitable solvent may be present, and any water formed may be distilled off continuously during the esterification process. The solvent may remain behind in the final product, or may be removed, if desired.

*Semi-finished esterification product, Example 2*

The same procedure is followed as in Example 1 above, except that the intermediate product is prepared from commercial diethanolamine and castor oil. See Intermediate amine, Example 5.

Having prepared the semi-finished esterification products above described, it is only necessary to react such complex esters which are essentially half or fractional acids or fractional esters with the selected hydroxylated amine of the type previously described. It is necessary to note that simple mixture of the two produces a salt and not an ester, and that in order to produce esterification, one must heat to a temperature above the boiling point of water and below the point of decomposition. In other words, the conditions of esterification are those conventionally employed, and are comparable to the conditions employed preferably in the manufacture of the intermediate amine, and also in the manufacture of the semi-finished esterification product.

*Composition of matter, Example 1*

A fairly large quantity of the semi-finished esterification product produced according to Semi-finished esterification product, Example 1, is divided into three equal portions. Each portion then, is neutralized with sufficient polymerized ethanol-amine of the kind described in Polymerized hydroxy amine, Examples 1, 2 and 3, to eliminate one-third the free acidity. The product in all the three separate mixtures are then heated in three separate vessels or consecutively in the same vessel until substantially all, and preferably all, of the acidity, due to the presence of the hydrogen carboxyl radical, has disappeared, or are heated at least to the point where water is no longer driven off.

*Composition of matter, Example 2*

The same procedure is followed as in Composition of matter, Example 1, preceding, except that the amounts of polymerized triethanolamine added in each of the three instances is sufficient to neutralize two thirds of the acidity before the final esterification step.

*Composition of matter, Example 3*

The same procedure is followed as in Composition of matter, Example 1, except that sufficient polymerized triethanolamine is added in all three instances to neutralize completely all the acidity before the final esterification step.

*Composition of matter, Example 4*

The same procedure is followed as in Composition of matter, Example 1, except that one employs Semi-finished esterification product, Example 2, instead of Example 1, and a sufficient amount of the three different polymerized triethanolamine products is added to neutralize one-half the total acidity.

*Composition of matter, Example 5*

The same procedure is followed as in Example 4, except that sufficient polymerized triethanolamine is added to neutralize all the acidity before the final esterification step.

*Composition of matter, Example 6*

Polymerized tri-isopropanolamine prepared according to Polymerized hydroxy amine, Example 2, above, is substituted for polymerized triethanolamine in Examples 1 to 5, inclusive, preceding.

*Composition of matter, Example 7*

Maleic anhydride is substituted for phthalic anhydride in Composition of matter, Examples 1 to 6, inclusive, preceding.

It has been previously pointed out that certain amines such as monoglycerylamine, diglycerylamine, monoglyceryldiethanolamine, monoglyceryldipropylamine, diglycerylpropylamine, triglycerylamine, etc., are the functional equivalents of various amines previously described in the manufacture of polymerized hydroxy amines. It is to be noted that these same glyceryl amines are also the functional equivalent of the various alcohol amines employed in the manufacture of the acylated amines, and thus may be substituted, for example, in the previous examples.

As previously stated, the polymerized hydroxy amine may be acylated by the introduction of various detergent-forming acid radicals, and radicals derived from acids having less than eight carbon atoms, as, for example, acetic acid, heptoic acid, and the like. As has been stated, the hydroxy amines may be etherized in the manner previously described, but in any event, there must be a bond between at least one polybasic acid residue, such as phthalic acid residue, and the polymerized amine. It is to be noted that in the hereto appended claims, where reference is made to non-acylated polymerized hydroxy amines, it is concerned with the type which is free from acyl radicals, other than acyl radicals derived from polybasic carboxy acids, or acyl radicals derived from non-detergent-forming acids, i. e., carboxy acids containing less than eight carbon atoms, as, for example, acetic acid or heptoic acid. Furthermore, it is intended in the hereto appended claims that such polymerized hydroxy amines shall not contain radicals derived from monohydric alcohols having six carbon atoms, or more, as, for example, hexyl alcohol, octyl alcohol, decyl alcohol, or octadecyl alcohol. The polymerized hydroxy amines may contain radicals derived from ethyl alcohol, propyl alcohol, butyl alcohol, amyl alcohol, or the like. As has been indicated, this limitation does not exclude ethers derived from various glycerols, polyglycerols, and the like, all of which are polyhydric.

Similarly, it is evident that where reference is made to phthalic acid, some simple derivative, such as chlorinated phthalic acid, brominated phthalic acid, methylated phthalic acid, or the like, would simply act as a functional equivalent. This applies not only to phthalic acid, but to all the dibasic acids enumerated. Similarly, it is evident that there is no intention to differentiate between isomeric forms. One isomeric form may serve as well as another.

We are aware that in complex esterification of the kind indicated, one may obtain products which are resinous or semi-resinous in nature and represent polymeric or semi-polymeric forms of simple monomers, which may perhaps be indicated by structural formulas of a rather complex nature. If one cares to indicate the product by a structural formula which contemplates the monomer, then obviously the polymer would represent such bracketed monomer followed by a sub-letter $n$ to indicate the polymeric form, with the proviso that a certain amount of water would be eliminated in the polymeric form; and thus, the composition of the polymeric form and the monomeric form, as far as structural formulas go, would be slightly different. But it is our intention that if the product need be designated by a structural formula, the formula for the monomer shall be understood also to include the structure for the polymer.

As has been pointed out previously, where fatty acids occur, or polybasic carboxy acids occur, or residues thereof, any ionizable hydrogen atom or the equivalent thereof may be replaced by a suitable metallic atom, such as a sodium atom or an ammoniumradical or an amine radical, or an organic radical derived from an amine, particularly a hydroxylated amine, or from a monohydric or polyhydric alcohol. As to this equivalency, we again emphasize that it is intended that in the claims and specification, the expression "fatty acid compound" or "polybasic carboxy acid compound" shall contemplate all the various forms; and we specifically include all the functional equivalents which have been described in great detail in our aforementioned pending application.

The functional equivalents of all these variations have been pointed out previously and are readily comprehended; and the scope of the claims in the light of such obvious equivalents requires no further discussion.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

Having thus described our invention, what we claim as new and desire to secure by Letters Patent is:

1. A process for breaking petroleum emulsions of the water-in-oil type, characterized by subjecting the emulsion to the action of a demulsifying agent, comprising products of the kind derivable by an esterification reaction between: First, a heat polymerized basic hydroxy amine; and second, a fractional ester containing at least one carboxyl radical and of the kind derivable by esterification reaction between: on the one hand, an amine of the formula type:

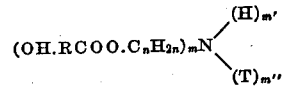

in which OH.RCOO represents the oxy-acyl radical derived from a hydroxylated fatty acid having at least 8 and not more than 32 carbon atoms; T represents a hydrocarbon radical of the non-hydroxy acylated radical obtained by replacing the hydrogen atom of the hydroxyl group of an alkylol radical by the acyl radical of a monobasic carboxy acid having less than 32 carbon atoms; $n$ represents a small whole number which is less than 10; $m$ represents the numeral 1, 2 or 3; $m'$ represents the numeral 0, 1 or 2, and $m''$ represents the numeral 0, 1 or 2, with the proviso that $m+m'+m''=3$; and on the other hand, a polybasic carboxy acid compound characterized by: (a) the absence of any hydroxy fatty acid radical as a substituent for an acidic hydrogen atom of any carboxyl radical; and (b) the absence of any polyhydric alcohol radical as a substituent for an acidic hydrogen atom of any carboxyl radical if said polyhydric alcohol radical is also united with one or more monobasic carboxy detergent-forming acid radicals.

2. A process for breaking petroleum emulsions of the water-in-oil type, characterized by subjecting the emulsion to the action of a demulsifying agent, comprising products of the kind derivable by an esterification reaction between: First, a non-acylated heat polymerized basic hydroxy amine; and second, a fractional ester containing at least one carboxyl radical and of the kind derivable by esterification reaction between: on the one hand, an amine of the formula type:

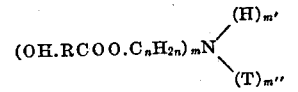

in which OH.RCOO represents the oxy-acyl radical derived from a hydroxylated fatty acid having at least 8 and not more than 32 carbon atoms; T represents a hydrocarbon radical or the non-hydroxy acylated radical obtained by replacing the hydrogen atom of the hydroxyl group of an alkylol radical by the acyl radical of a monobasic carboxy acid having less than 32 carbon atoms; $n$ represents a small whole number which is less than 10; $m$ represents the numeral 1, 2, or 3; $m'$ represents the numeral 0, 1 or 2, and $m''$ represents the numeral 0, 1 or 2, with the proviso that $m+m'+m''=3$; and on the other hand, a polybasic carboxy acid compound characterized by: (a) the absence of any hydroxy fatty acid radical as a substituent for an acidic hydrogen atom of any carboxyl radical; and (b) the absence of any polyhydric alcohol radical as a substituent for an acidic hydrogen atom of any carboxyl radical if said polyhydric alcohol radical is also united with one or more monobasic carboxy detergent-forming acid radicals.

3. A process for breaking petroleum emulsions of the water-in-oil type, characterized by subjecting the emulsion to the action of a demulsifying agent, comprising products of the kind derivable by an esterification reaction between: First, a non-acylated heat polymerized basic hydroxy amine free from an ether radical derived from a monohydric alcohol; and second, a fractional ester containing at least one carboxyl radical and of the kind derivable by esterification reaction between: on the one hand, an amine of the formula type:

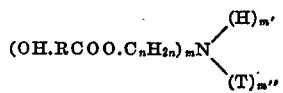

in which OH.RCOO represents the oxy-acyl radical derived from a hydroxylated fatty acid having at least 8 and not more than 32 carbon atoms; T represents a hydrocarbon radical or the non-hydroxy acylated radical obtained by replacing the hydrogen atom of the hydroxyl group of an alkylol radical by the acyl radical of a monobasic carboxy acid having less than 32 carbon atoms; $n$ represents a small whole number which is less than 10; $m$ represents the numeral 1, 2 or 3, $m'$ represents the numeral 0, 1 or 2, and $m''$ represents the numeral 0, 1 or 2, with the proviso that $m+m'+m''=3$; and on the other hand, a polybasic carboxy acid compound characterized by: (a) the absence of any hydroxy fatty acid radical as a substituent for an acidic hydrogen atom of any carboxyl radical; and (b) the absence of any polyhydric alcohol radical as a substituent for an acidic hydrogen atom of any carboxyl radical if said polyhydric alcohol radical is also united with one or more monobasic carboxy detergent-forming acid radicals.

4. A process for breaking petroleum emulsions of the water-in-oil type, characterized by subjecting the emulsion to the action of a demulsifying agent, comprising products of the kind derivable by an esterification reaction between: First, a non-acylated heat polymerized basic hydroxy amine free from ether radicals derived from an alcohol; and second, a fractional ester containing at least one carboxyl radical and of the kind derivable by esterification reaction between: On the one hand, an amine of the formula type:

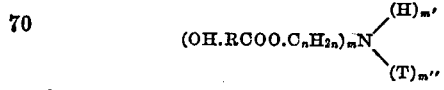

in which OH.RCOO represents the oxy-acyl radical derived from a hydroxylated fatty acid having at least 8 and not more than 32 carbon atoms; T represents a hydrocarbon radical or the non-hydroxy acylated radical obtained by replacing the hydrogen atom of the hydroxyl group of an alkylol radical by the acyl radical of a monobasic carboxy acid having less than 32 carbon atoms; $n$ represents a small whole number which is less than 10; $m$ represents the numeral 1, 2 or 3; $m'$ represents the numeral 0, 1 or 2, and $m''$ represents the numeral 0, 1 or 2, with the proviso that $m+m'+m''=3$; and on the other hand, a polybasic carboxy acid compound characterized by: (a) the absence of any hydroxy fatty acid radical as a substituent for an acidic hydrogen atom of any carboxyl radical; and (b) the absence of any polyhydric alcohol radical as a substituent for an acidic hydrogen atom of any carboxyl radical if said polyhydric alcohol radical is also united with one or more monobasic carboxy detergent-forming acid radicals.

5. A process for breaking petroleum emulsions of the water-in-oil type, characterized by subjecting the emulsion to the action of a demulsifying agent, comprising products of the kind derivable by an esterification reaction between: First, a water-soluble, non-acylated heat polymerized basic hydroxy amine free from an ether linkage derived from an alcohol; and second, a fractional ester containing at least one carboxyl radical and of the kind derivable by esterification reaction between: on the one hand, an amine of the formula type:

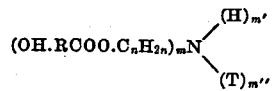

in which OH.RCOO represents the oxy-acyl radical derived from a hydroxylated fatty acid having at least 8 and not more than 32 carbon atoms; T represents a hydrocarbon radical or the non-hydroxy acylated radical obtained by replacing the hydrogen atom of the hydroxyl group of an alkylol radical by the acyl radical of a monobasic carboxy acid having less than 32 carbon atoms; $n$ represents a small whole number which is less than 10; $m$ represents the numeral 1, 2 or 3; $m'$ represents the numeral 0, 1 or 2, and $m''$ represents the numeral 0, 1 or 2, with the proviso that $m+m'+m''=3$; and on the other hand, a polybasic carboxy acid compound characterized by: (a) the absence of any hydroxy fatty acid radical as a substituent for an acidic hydrogen atom of any carboxyl radical; and (b) the absence of any polyhydric alcohol radical as a substituent for an acidic hydrogen atom of any carboxyl radical if said polyhydric alcohol radical is also united with one or more monobasic carboxy detergent-forming acid radicals.

6. A process for breaking petroleum emulsions of the water-in-oil type, characterized by subjecting the emulsion to the action of a demulsifying agent, comprising products of the kind derivable by an esterification reaction between: First, a water-soluble, non-acylated heat polymerized basic hydroxy amine free from an ether linkage derived from an alcohol; and second, a fractional ester containing at least one carboxyl radical and derived by esterification reaction between: on the one hand, an amine of the formula type:

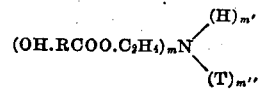

in which OH.RCOO represents the oxy-acyl radical derived from a hydroxylated fatty acid having at least 8 and not more than 32 carbon atoms; T represents a hydrocarbon radical or the non-hydroxy acylated radical obtained by replacing a hydrogen atom of the hydroxyl group of an alkylol radical by the acyl radical of a monobasic carboxy acid having less than 32 carbon atoms; $m$ represents the numeral 1, 2 or 3; $m'$ represents the numeral 0, 1 or 2, and $m''$ represents the numeral 0, 1 or 2, with the proviso that $m+m'+m''=3$; and on the other hand, a polybasic carboxy acid compound characterized by: (a) the absence of any hydroxy fatty acid radical as a substituent for an acidic hydrogen atom of any carboxyl radical; and (b) the absence of any polyhydric alcohol radical as a substituent for an acidic hydrogen atom of any carboxyl radical if said polyhydric alcohol radical is also united with one or more monobasic carboxy detergent-forming acid radicals.

7. A process for breaking petroleum emulsions of the water-in-oil type, characterized by subjecting the emulsion to the action of a demulsifying agent, comprising products of the kind derivable by an esterification reaction between: First, a water-soluble, non-acylated heat polymerized basic hydroxy amine free from an ether linkage derived from an alcohol; and second, a fractional ester containing at least one carboxyl radical and derived by esterification reaction between: on the one hand, an amine of the formula type:

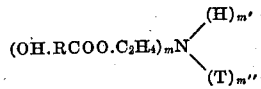

in which OH.RCOO represents the oxy-acyl radical derived from ricinoleic acid; T represents a hydrocarbon radical or the non-hydroxy acylated radical obtained by replacing a hydrogen atom of the hydroxyl group of an alkylol radical by the acyl radical of a monobasic carboxy acid having less than 32 carbon atoms; $m$ represents the numeral 1, 2 or 3; $m'$ represents the numeral 0, 1 or 2, and $m''$ represents the numeral 0, 1 or 2, with the proviso that $m+m'+m''=3$; and on the other hand, a polybasic carboxy acid compound characterized by: (a) the absence of any hydroxy fatty acid radical as a substituent for an acidic hydrogen atom of any carboxyl radical; and (b) the absence of any polyhydric alcohol radical as a substituent for an acidic hydrogen atom of any carboxyl radical if said polyhydric alcohol radical is also united with one or more monobasic carboxy detergent-forming acid radicals.

8. A process for breaking petroleum emulsions of the water-in-oil type, characterized by subjecting the emulsion to the action of a demulsifying agent, comprising products of the kind derivable by an esterification reaction between: First, a water-soluble, non-acylated heat polymerized basic hydroxy amine of the dimeric type free from an ether linkage derived from an alcohol; and second, a fractional ester containing at least one carboxyl radical and derived by esterification reaction between: on the one hand, an amine of the formula type:

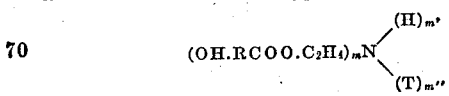

in which OH.RCOO represents the oxy-acyl radical derived from ricinoleic acid; T represents a hydrocarbon radical or the non-hydroxy acylated radical obtained by replacing a hydrogen atom of the hydroxyl group of an alkylol radical by the acyl radical of a monobasic carboxy acid having less than 32 carbon atoms; $m$ represents the numeral 1, 2 or 3; $m'$ represents the numeral 0, 1 or 2, and $m''$ represents the numeral 0, 1 or 2, with the proviso that $m+m'+m''=3$; and on the other hand, a polybasic carboxy acid compound characterized by: (a) the absence of any hydroxy fatty acid radical as a substituent for an acidic hydrogen atom of any carboxy radical; and (b) the absence of any polyhydric alcohol radical as a substituent for an acidic hydrogen atom of any carboxyl radical if said polyhydric alcohol radical is also united with one or more monobasic carboxy detergent-forming acid radicals.

9. A process for breaking petroleum emulsions of the water-in-oil type, characterized by subjecting the emulsion to the action of a demulsifying agent, comprising products of the kind derivable by an esterification reaction between: First, a water-soluble, non-acylated heat polymerized basic hydroxy amine of the polymeric type free from an ether linkage derived from an alcohol; and second, a fractional ester containing at least one carboxyl radical and derived by esterification reaction between: on the one hand, an amine of the formula type:

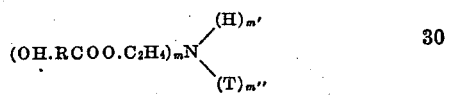

in which OH.RCOO represents the oxy-acyl radical derived from ricinoleic acid; T represents a hydrocarbon radical or the non-hydroxy acylated radical obtained by replacing a hydrogen atom of the hydroxyl group of an alkylol radical by the acyl radical of a monobasic carboxy acid having less than 32 carbon atoms; $m$ represents the numeral 1, 2 or 3; $m'$ represents the numeral 0, 1 or 2, and $m''$ represents the numeral 0, 1 or 2, with the proviso that $m+m'+m''=3$; and on the other hand, a polybasic carboxy acid compound characterized by: (a) the absence of any hydroxy fatty acid radical as a substituent for an acidic hydrogen atom of any carboxyl radical; and (b) the absence of any polyhydric alcohol radical as a substituent for an acidic hydrogen atom of any carboxyl radical if said polyhydric alcohol radical is also united with one or more monobasic carboxy detergent-forming acid radicals.

10. A process for breaking petroleum emulsions of the water-in-oil type, characterized by subjecting the emulsion to the action of a demulsifying agent, comprising products of the kind derivable by an esterification reaction between: First, a water-soluble, non-acylated heat polymerized basic hydroxy amine of the surface active type free from an ether linkage derived from an alcohol; and second, a fractional ester containing at least one carboxyl radical and derived by esterification reaction between: on the one hand, an amine of the formula type:

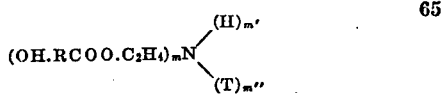

in which OH.RCOO represents the oxy-acyl radical derived from ricinoleic acid; T represents a hydrocarbon radical or the non-hydroxy acylated radical obtained by replacing a hydrogen atom of the hydroxyl group of an alkylol radical by the acyl radical of a monobasic carboxy acid having less than 32 carbon atoms; $m$ represents the numeral 1, 2 or 3; $m'$ represents the numeral 0, 1 or 2, and $m''$ represents the numeral 0, 1 or 2, with the proviso that $m+m'+m''=3$; and on the other hand, a polybasic carboxy acid compound characterized by: (a) the absence of any hydroxy fatty acid radical as a substituent for an acidic hydrogen atom of any carboxyl radical; and (b) the absence of any polyhydric alcohol radical as a substituent for an acidic hydrogen atom of any carboxyl radical if said polyhydric alcohol radical is also united with one or more monobasic carboxy detergent-forming acid radicals.

MELVIN DE GROOTE.
BERNHARD KEISER.
CHARLES M. BLAIR, Jr.

CERTIFICATE OF CORRECTION.

Patent No. 2,231,758.　　　　　　　　　　　　　　February 11, 1941.

MELVIN DE GROOTE, ET AL.

It is hereby certified that error appears in the printed specification of the above numbered patent requiring correction as follows: Page 4, first column, line 67, strike out the words "in which Z represents any suitable atom, such as" and insert the same before "a sodium" in line 65; and that the said Letters Patent should be read with this correction therein that the same may conform to the record of the case in the Patent Office.

Signed and sealed this 6th day of May, A. D. 1941.

Henry Van Arsdale,
(Seal)　　　　　　　　　　　　　　　　　　Acting Commissioner of Patents.